(12) United States Patent
Hosoya et al.

(10) Patent No.: US 11,340,593 B2
(45) Date of Patent: May 24, 2022

(54) MANAGEMENT DEVICE, RELAY DEVICE, FIELD WIRELESS SYSTEM, SETTING METHOD, AND RECORDING MEDIUM

(71) Applicant: Yokogawa Electric Corporation, Tokyo (JP)

(72) Inventors: Kensuke Hosoya, Tokyo (JP); Hirokazu Sasaki, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 180 days.

(21) Appl. No.: 16/490,654

(22) PCT Filed: Mar. 6, 2018

(86) PCT No.: PCT/JP2018/008531
§ 371 (c)(1),
(2) Date: Sep. 3, 2019

(87) PCT Pub. No.: WO2018/164107
PCT Pub. Date: Sep. 13, 2018

(65) Prior Publication Data
US 2020/0004229 A1    Jan. 2, 2020

(30) Foreign Application Priority Data
Mar. 6, 2017    (JP) ............................. JP2017-042221

(51) Int. Cl.
*G05B 19/418* (2006.01)
*G05B 19/05* (2006.01)

(52) U.S. Cl.
CPC ....... *G05B 19/4185* (2013.01); *G05B 19/054* (2013.01); *G05B 2219/15117* (2013.01)

(58) Field of Classification Search
CPC ............. G05B 19/4185; G05B 19/054; G05B 2219/15117; G05B 2219/31104; G05B 19/05
(Continued)

(56) References Cited

U.S. PATENT DOCUMENTS

| 6,098,116 A | 8/2000 | Nixon et al. |
| 6,449,715 B1 | 9/2002 | Krivoshein |

(Continued)

FOREIGN PATENT DOCUMENTS

| DE | 102004048766 A1 | 4/2006 |
| EP | 3096449 A1 | 11/2016 |

(Continued)

OTHER PUBLICATIONS

Yoshio Yoshida et al., "New Plant-wide Field Wireless System," Yokogawa Technical Report, 2012, pp. 45-48 (8 pages), vol. 55, No. 2.

*Primary Examiner* — Hien D Khuu
(74) *Attorney, Agent, or Firm* — Sughrue Mion, PLLC

(57) ABSTRACT

A management device according to an aspect of the present invention transmits and receives information to and from a relay device that is able to communicate with a field device installed in a plant. The management device includes a storage unit including a first setting storage area configured to store first setting information that is setting information of the relay device and a second setting storage area configured to store second setting information that is setting information of the field device and a first setting management unit that writes the first setting information and the second setting information to the relay device.

20 Claims, 10 Drawing Sheets

(58) Field of Classification Search
USPC .......................................................... 700/83
See application file for complete search history.

(56) References Cited

U.S. PATENT DOCUMENTS

| | | | | |
|---|---|---|---|---|
| 8,994,493 | B2* | 3/2015 | Nakamoto | G05B 19/418 340/3.9 |
| 2009/0010233 | A1* | 1/2009 | Pratt, Jr. | G01D 21/00 370/338 |
| 2009/0016462 | A1 | 1/2009 | Da Silva Neto | |
| 2011/0213900 | A1 | 9/2011 | Nakamoto et al. | |
| 2011/0302635 | A1* | 12/2011 | Pratt, Jr. | G01D 21/00 726/4 |
| 2012/0161978 | A1* | 6/2012 | Sakurai | H04L 41/0866 340/870.02 |
| 2013/0268097 | A1* | 10/2013 | McKelvey | G05B 19/05 700/83 |
| 2014/0336786 | A1* | 11/2014 | Asenjo | G06F 3/048 700/17 |
| 2015/0156286 | A1* | 6/2015 | Blair | H04L 69/08 709/201 |
| 2015/0287318 | A1* | 10/2015 | Nair | G08C 17/02 340/5.52 |
| 2016/0267479 | A1* | 9/2016 | Chung | G06Q 20/387 |
| 2016/0274552 | A1* | 9/2016 | Strohmenger | G06Q 10/06 |
| 2017/0300432 | A1* | 10/2017 | Kitamura | G06F 13/16 |

FOREIGN PATENT DOCUMENTS

| | | | |
|---|---|---|---|
| JP | 2011-205607 A | | 10/2011 |
| JP | 2012133690 | * | 7/2012 |

* cited by examiner

MANAGEMENT DEVICE, RELAY DEVICE, FIELD WIRELESS SYSTEM, SETTING METHOD, AND RECORDING MEDIUM

CROSS REFERENCE TO RELATED APPLICATIONS

This application is a National Stage of International Application No. PCT/JP2018/008531 filed Mar. 6, 2018, claiming priority based on Japanese Patent Application No. 2017-042221 filed Mar. 6, 2017, the entire contents of each of which are incorporated by reference herein.

TECHNICAL FIELD

The present invention relates to a management device, a relay device, a field wireless system, a setting method, and a recording medium.

BACKGROUND ART

In the related art, field devices and gateways are installed in plants. Field devices are measuring devices such as sensors or operation devices such as actuators and wirelessly communicate with a gateway.

The gateway connects a network of a control room for controlling and managing the plants and networks of the plants with each other. Specifically, the gateway is connected to a programmable logic controller (hereinafter referred to as a "PLC") installed in the control room through a communication cable. Thus, the PLC can collect information measured by field devices via the gateway.

In the related art, to set predetermined setting information in a PLC, an engineer needs to use an engineering tool dedicated to PLCs (hereinafter, referred to as a "PLC engineering tool"). Specifically, the engineer connects the PLC engineering tool to the PLC and sets predetermined setting information in the PLC from the PLC engineering tool.

On the other hand, settings on setting information in a gateway or field device are performed using an engineering tool dedicated to gateways (hereinafter, a "gateway engineering tool"). Specifically, the engineer connects the gateway engineering tool to the gateway and sets predetermined setting information in the gateway or field device from the gateway engineering tool.

CITATION LIST

Non-Patent Literature 1
Yoshio Yoshida and 5 others, "Next-generation plant wide-field wireless system," Yokogawa Technical Report Vol. 55 No. 2 (2012)

SUMMARY OF INVENTION

Technical Problem

When setting or changing setting information in the gateway or field device, the engineer needs to go to the plant from the control room in order to connect the gateway engineering tool to the gateway. Further, the engineer may not be able to easily move between the control room and the plant when the control room and the plant are located far away from each other or when their security or safety standards are different. This may reduce the work efficiency of engineers.

Furthermore, it is necessary to separately prepare a PLC engineering tool for setting the PLC and a gateway engineering tool for setting the gateway or field device. This complicates the task of associating setting information of the PLC and setting information of the gateway or field device with each other, which may reduce the work efficiency of engineers.

An aspect of the present invention provides a management device, a relay device, a field wireless system, a setting method, a program, and a recording medium that can improve the work efficiency of engineers.

Solution to Problem

A management device according to a first aspect of the present invention may be a management device configured to transmit and receive information to and from a relay device that is able to communicate with a field device installed in a plant, the management device including a storage unit including a first setting storage area configured to store first setting information that is setting information of the relay device and a second setting storage area configured to store second setting information that is setting information of the field device, and a first setting management unit configured to write the first setting information and the second setting information to the relay device.

The management device may further include a first communicator that is able to communicate with the relay device. The first setting management unit may be configured to write, upon detecting that the first communicator and the relay device are communicably connected, the first setting information stored in the first setting storage area and the second setting information stored in the second setting storage area to the relay device via the first communicator.

In the management device, the first setting management unit may be configured to acquire identification information identifying a relay device from a relay device communicably connected to the first communicator, determine whether or not the communicably connected relay device is a relay device to which writing is to be performed on the basis of the acquired identification information, and write, upon determining that the communicably connected relay device is a relay device to which writing is to be performed, the first setting information and the second setting information to a relay device that is associated with the acquired identification information via the first communicator.

A relay device according to a second aspect of the present invention may be a relay device configured to relay information communicated between a field device installed in a plant and a management device, the relay device including a second setting management unit configured to write to the field device second setting information from among first setting information that is setting information of the relay device and the second setting information that is setting information of the field device, the first and second setting information having been written by the management device.

The relay device may further include a volatile storage unit to which the first setting information and the second setting information are written by the management device, and a second communicator that is communicably connectable to the field device, wherein the second setting management unit is configured to write, upon detecting that the second communicator and the field device are communicably connected, the second setting information stored in the storage unit to the field device.

In the relay device, the second communicator may be configured to receive a join request from the field device.

The second setting management unit may be configured to determine whether or not the field device is a field device to which writing is to be performed on the basis of the received join request and write, upon determining that the field device is a field device to which writing is to be performed, the second setting information to the field device which has transmitted the join request.

In the relay device, the second setting management unit may be configured to determine that the field device is a field device to which writing is to be performed when the received join request and join information stored in the storage unit match.

In the relay device, the second setting management unit may be configured to determine whether or not the second setting information stored in the storage unit has been updated, determine, upon determining that the second setting information stored in the storage unit has been updated, whether or not the updated second setting information is second setting information that is associated with the field device that has already been communicably connected, and write, upon determining that the updated second setting information is second setting information that is associated with the field device that has already been communicably connected, the updated second setting information to the field device that has already been communicably connected.

A field wireless system according to a third aspect of the present invention may include a field device installed in a plant, a relay device that is able to communicate with the field device, and a management device that is able to transmit and receive information to and from the relay device. The management device may include a storage unit including a first setting storage area configured to store first setting information that is setting information of the relay device and a second setting storage area configured to store second setting information that is setting information of the field device and a first setting management unit configured to write the first setting information and the second setting information to the relay device. The relay device may include a second setting management unit configured to write the second setting information, from among the first and second setting information written by the management device, to the field device.

A setting method according to a fourth aspect of the present invention may be a setting method for setting setting information in a field device installed in a plant and a relay device configured to relay information communicated between the field device and a management device. The management device may include a storage unit including a first setting storage area configured to store first setting information that is setting information of the relay device and a second setting storage area configured to store second setting information that is setting information of the field device. The setting method may include causing the management device to write, when the management device is communicably connected to the relay device, the first setting information and the second setting information to the relay device, and causing the relay device to write the second setting information, from among the first and second setting information written by the management device, to the field device.

A program according to a fifth aspect of the present invention may be a program causing a computer to function as a management device configured to set setting information in a relay device configured to relay information communicated between a field device installed in a plant and the management device, wherein the program causes the computer to store first setting information that is setting information of the relay device, store second setting information that is setting information of the field device, and write the first setting information and the second setting information to the relay device.

A computer readable recording medium according to a sixth aspect of the present invention may record the program.

Advantageous Effects of Invention

As described above, according to an aspect of the present invention, it is possible to improve the work efficiency of engineers. It is also possible to integrate engineering of the PLC and engineering of the gateway, the field device or the like and to facilitate association of setting information of the PLC and setting information of the gateway or field device with each other.

DESCRIPTION OF EMBODIMENTS

Figure 1:
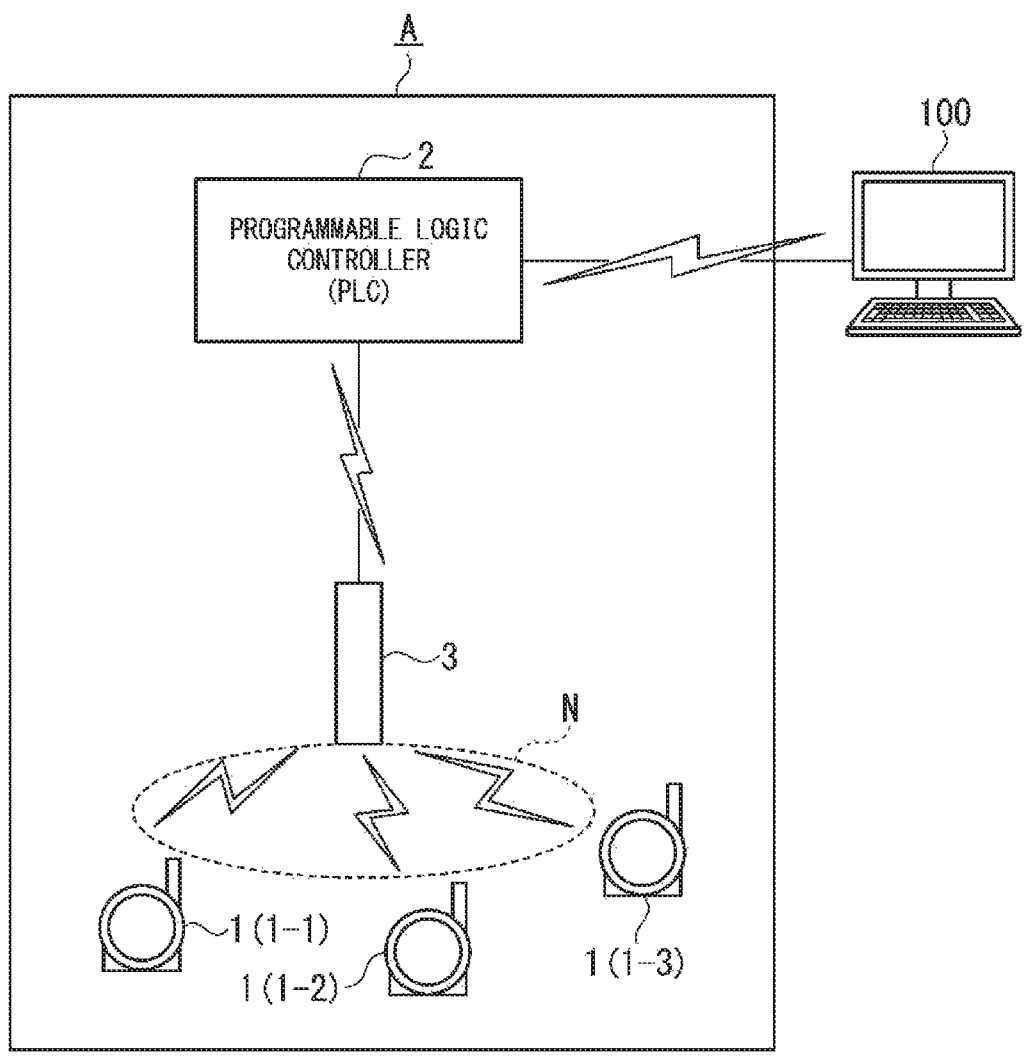
FIG. 1 is a diagram showing an example of a schematic configuration of a field wireless system A according to an embodiment of the present invention.

Hereinafter, the present invention will be described through embodiments of the invention, but the following embodiments do not limit the invention according to the claims. Not all combinations of features described in the embodiments are essential to the solution of the invention. In the drawings, the same or similar parts may be denoted by the same reference signs and redundant description may be omitted. The shapes and sizes of elements in the drawings may be exaggerated for a clearer explanation.

Throughout the specification, when it is stated that a part "includes," "has" or "includes" a component, this means that the part may further include other components rather than excluding other components unless specifically stated otherwise.

Hereinafter, a field wireless system according to an embodiment of the present invention will be described using the drawings.

FIG. 1 is a diagram showing an example of a schematic configuration of the field wireless system A according to an embodiment of the present invention.

The field wireless system A controls industrial processes realized by plants (not shown) and manages equipment such as devices or apparatuses such as field devices constituting the plants. Such plants include not only industrial plants such as chemical plants but also plants for managing and controlling well sources such as gas and oil fields and their surroundings, plants for managing and controlling power generation such as hydropower, thermal power and nuclear power, plants for managing and controlling environmental power generation such as solar light and wind power, and plants for managing and controlling water and sewage, dams, and the like.

As shown in FIG. 1, the field wireless system A includes, for example, field devices 1, a programmable logic controller (hereinafter referred to as a "PLC") 2, and a gateway 3. The PLC 2 is an example of the "management device" in the present invention. The gateway 3 is an example of the "relay device" in the present invention.

A field device 1 is installed at a site of a plant. The field device 1 performs control, operation, or the like necessary for process control in the plant. Process control refers to control of various state quantities (for example, pressure, temperature, and flow rate) in an industrial process in the plant. For example, the field device 1 is a sensor device such as a flow meter or a temperature sensor, a valve device such as a flow control valve or an on-off valve, or an actuator device such as a fan or a motor.

The field device 1 performs wireless communication with the gateway 3 to transmit and receive information to and from the gateway 3. For example, wireless communication between the field device 1 and the gateway 3 is wireless communication conforming to an industrial wireless standard such as ISA100.11a.

Information for wireless communication with the gateway 3 is preset in the field device 1, for example, at the time of factory shipment. The information for wireless communication with the gateway 3 refers to join information for joining a wireless communication network (hereinafter, referred to as a "wireless network") N on which the field device 1 and the gateway 3 communicate. The join information is, for example, "EUI 64," a "device tag," a "network ID," or a "join key."

The "EUI 64" is identification information with which it is possible to uniquely identify each field device 1 on the wireless network N.

The "device tag" is identification information with which it is possible to uniquely identify each field device 1 in process communication.

The "network ID" is identification information which is assigned in advance to the wireless network N and with which it is possible to uniquely identify the predetermined wireless network N from among a plurality of wireless networks N.

The "join key" is information corresponding to a password required when joining the wireless network N identified by the "network ID."

The field device 1 can transmit and receive information to and from the PLC 2 by joining the wireless network N on the basis of the join information and performing wireless communication with the gateway 3. For example, the field device 1 can transmit and receive process data required for process control to and from the PLC 2 via the gateway 3. The present embodiment will be described with reference to the case in which the field wireless system A includes a plurality of field devices 1 (1-1 to 1-3), but the present invention is not limited thereto. That is, the field wireless system A may include one or more field devices 1. Each of the plurality of field devices 1-1 to 1-3 will simply be referred to as a "field device 1" when not distinguished.

The PLC 2 is installed in a control room. The PLC 2 is communicably connected to the gateway 3. For example, the PLC 2 is communicably connected to the gateway 3 through serial communication. In the present embodiment, the PLC 2 performs serial communication with the gateway 3 by using Modbus (registered trademark) as a communication protocol. Thus, the PLC 2 can transmit and receive information to and from the field device 1 via the gateway 3.

An engineer can connect an engineering tool 100 to the PLC 2 wirelessly or by wire and can perform various settings on the PLC 2, the gateway 3, and each field device 1 from the engineering tool 100.

The engineering tool 100 creates information (setting information) that is to be set in each of the field device 1, the PLC 2, and the gateway 3, for example, in accordance with design data that is specifications of the plant. When connected to the PLC 2, the engineering tool 100 duplicates (copies) the setting information of each of the field device 1, the PLC 2, and the gateway 3 and outputs the duplicated information to the PLC 2.

Figure 2:
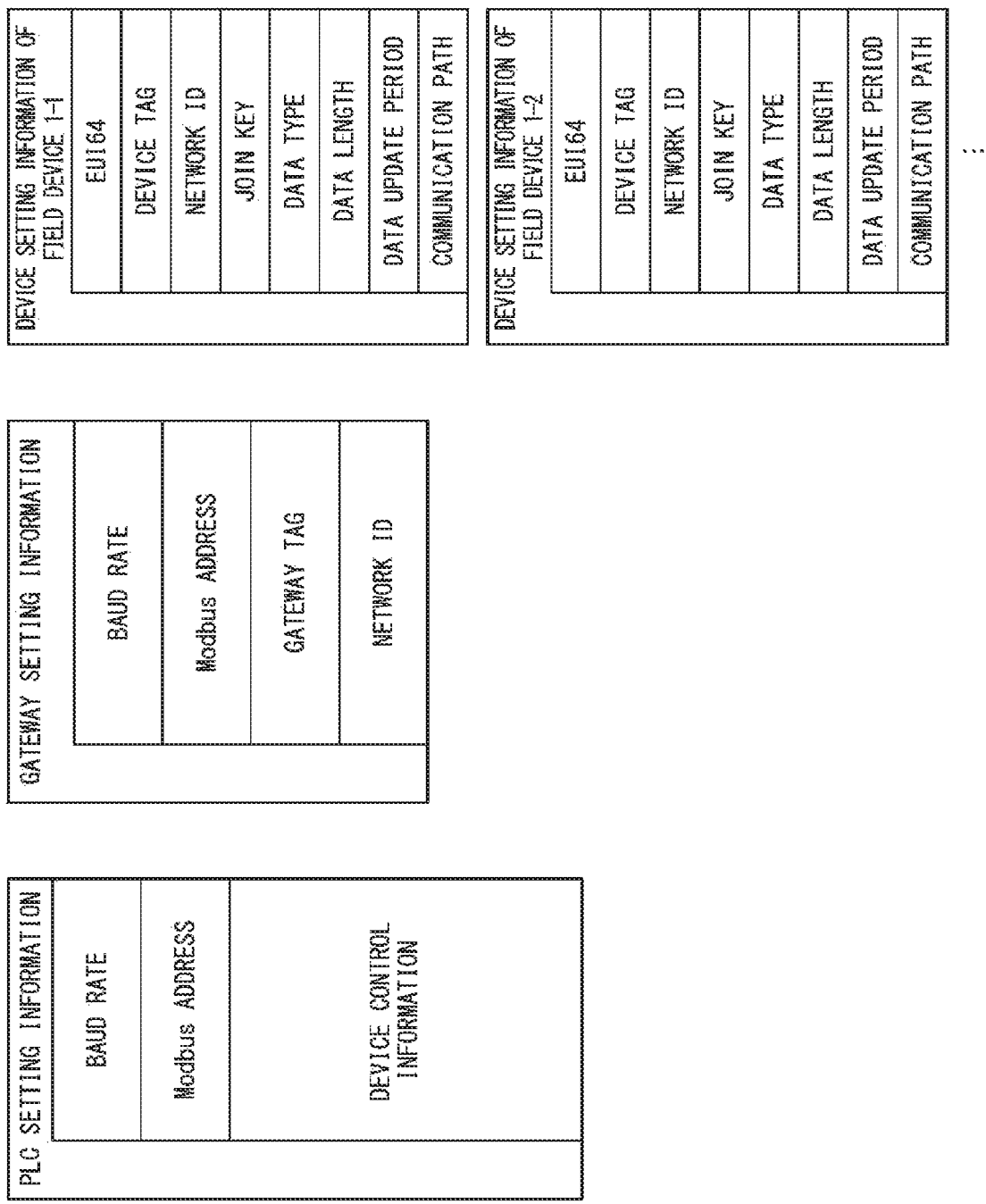
FIG. 2 is a diagram showing data structures of respective setting information of a field device 1, a PLC 2, and a gateway 3 according to an embodiment of the present invention.

FIG. 2 is a diagram showing data structures of respective setting information of the field device 1, the PLC 2, and the gateway 3 according to an embodiment of the present invention.

As shown in FIG. 2, the setting information of the field device 1 (hereinafter, "device setting information") includes, for example, join information such as EUI 64, a device tag, a join key, or a network ID and setting information of process communication such as a data type, a data update period, and a communication path (hereinafter referred to as "process setting information"). The join information in the device setting information is used to identify a field device 1 for which predetermined process setting information is to be set or changed. The device setting information may be created for each of the field devices 1-1 to 1-3.

The setting information of the PLC 2 (hereinafter, "PLC setting information") includes, for example, a baud rate for serial communication connection with the gateway 3, a Modbus address, and device control information. The device control information includes setting information of functional blocks of each of the field devices 1-1 to 1-3, a PLC program, and the like.

The setting information of the gateway 3 (hereinafter, "gateway setting information") includes a baud rate for serial communication connection with the PLC 2, a Modbus address, a gateway tag, and a network ID to which the gateway 3 belongs.

The gateway tag is identification information with which it is possible to uniquely identify each gateway 3. When there are a plurality of gateways 3, gateway setting information may be created for each gateway 3. A gateway 3 stores gateway setting information of the gateway 3 in advance.

A schematic configuration of the PLC 2 according to an embodiment of the present invention will be described below using FIG. 3.

Figure 3:
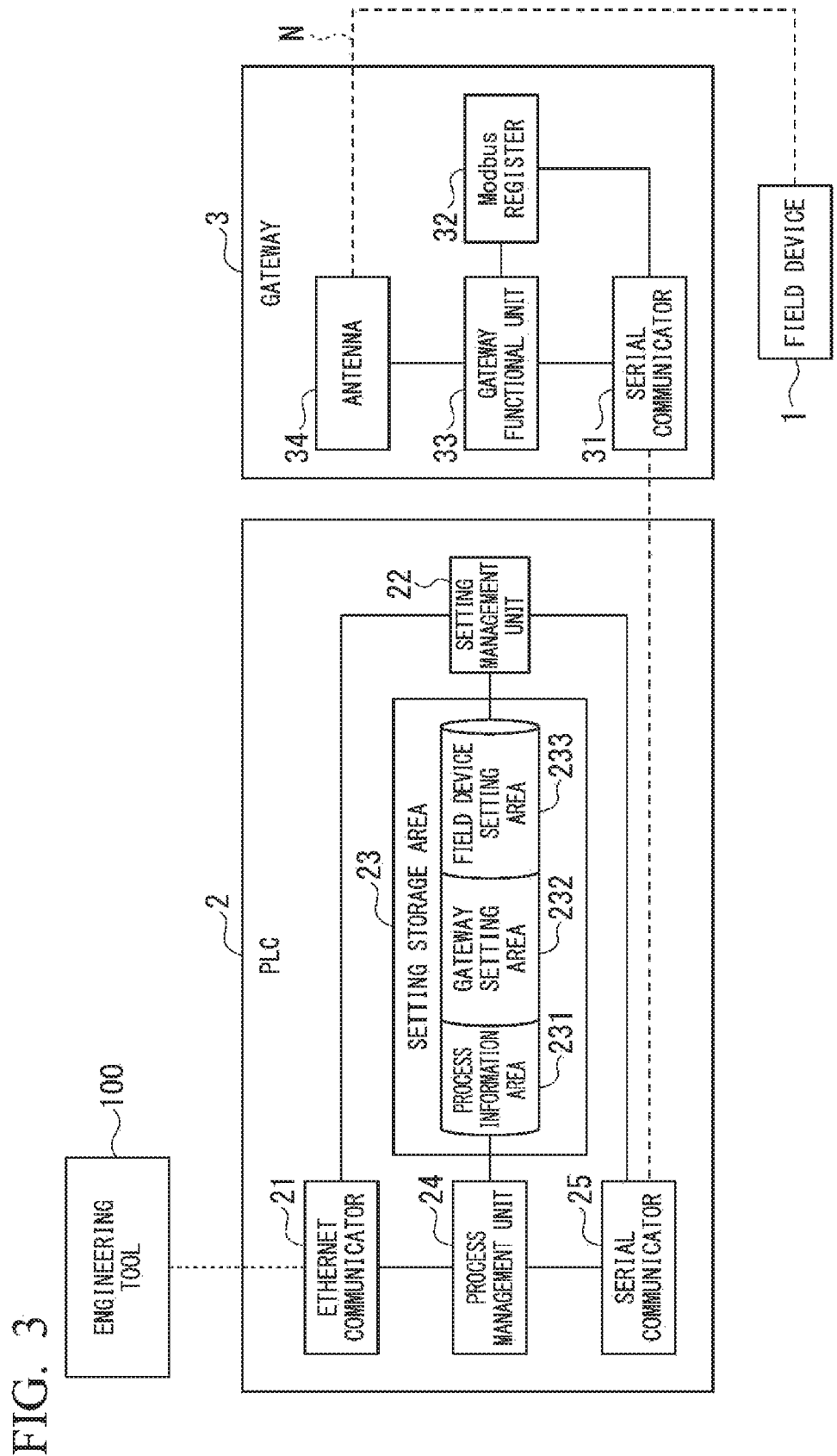
FIG. 3 is a diagram showing an example of a schematic configuration of the PLC 2 according to an embodiment of the present invention.

As shown in FIG. 3, the PLC 2 includes, for example, an Ethernet communicator 21, a setting management unit 22 (a first setting management unit), a setting storage area 23 (a storage unit), a process management unit 24, and a serial communicator 25. The serial communicator 25 is an example of the "first communicator" in the present invention.

The Ethernet communicator 21 is communicably connected to the engineering tool 100 via an Ethernet cable.

The setting management unit 22 acquires PLC setting information, gateway setting information (first setting information), and device setting information (second setting information) from the engineering tool 100 via the Ethernet communicator 21. Then, the setting management unit 22 stores the PLC setting information, the gateway setting information, and the device setting information acquired from the engineering tool 100 in the setting storage area 23. Thereby, the PLC setting information is set in the PLC 2.

The setting management unit 22 writes the gateway setting information and the device setting information to the gateway 3 via the serial communicator 25. For example, upon detecting that the gateway 3 is communicably connected to the serial communicator 25, the setting management unit 22 writes the gateway setting information and the device setting information stored in the setting storage area 23 to the gateway 3.

For example, the setting management unit 22 is communicably connected to the serial communicator 25 to acquire a gateway tag from the gateway 3. Then, the setting management unit 22 checks a gateway tag stored in the setting storage area 23 with the gateway tag acquired from the gateway 3. If the gateway tag stored in the setting storage area 23 and the gateway tag acquired from the gateway 3 match in the checking, the setting management unit 22 authenticates that the gateway 3 is a gateway 3 to which the setting information is to be written. Then, the setting management unit 22 writes the gateway setting information and the device setting information stored in the setting storage area 23 to the authenticated gateway 3.

The setting storage area 23 includes a process information area 231, a gateway setting area 232 (a first setting storage area), and a field device setting area 233 (a second setting storage area).

The process information area 231 is an area for storing PLC setting information. The gateway setting area 232 is an area for storing gateway setting information. The field device setting area 233 is an area for storing device setting information.

The process management unit 24 transmits and receives process data to and from each field device 1 through the serial communicator 25 and the gateway 3. The process management unit 24 stores process data acquired from field devices 1 in respective functional blocks of the field devices 1 in the process information area 231 via the serial communicator 25.

Next, a schematic configuration of the gateway 3 according to an embodiment of the present invention will be described using FIG. 3. This gateway 3 relays communication between the PLC 2 and each field device 1.

As shown in FIG. 3, the gateway 3 includes, for example, a serial communicator 31, a Modbus register 32 (a storage unit), a gateway functional unit 33, and an antenna 34. The gateway functional unit 33 is an example of the "second setting management unit" in the present invention. The Modbus register 32 is an example of a "third setting recording area" in the present invention. The antenna 34 is an example of the "second communicator" in the present invention.

The serial communicator 31 performs serial communication with the serial communicator 25.

The Modbus register 32 is a volatile storage area. The gateway setting information and the device setting information are written from the PLC 2 to the Modbus register 32 via the serial communicator 31. Thereby, the gateway setting information is set in the gateway 3.

The gateway functional unit 33 writes the device setting information from among the gateway setting information and the device setting information, which have been written to the Modbus register 32 by communication connection with the PLC 2, to the field device 1 via the antenna 34.

The antenna 34 is communicably connected to the field device 1 via the wireless network N.

For example, upon detecting that the antenna 34 and the field device 1 are communicably connected wirelessly, the gateway functional unit 33 writes the device setting information in the Modbus register 32 to the field device 1. The antenna 34 and the field device 1 are communicably connected wirelessly, for example, when the field device 1 is activated.

For example, the gateway functional unit 33 acquires join information of the field device 1 communicably connected to the antenna 34. Then, the gateway functional unit 33 checks the join information stored in the Modbus register 32 with the join information acquired from the field device 1. Then, if the join information stored in the Modbus register 32 and the join information acquired from the field device 1 match in the checking, the gateway functional unit 33 authenticates that the field device 1 is a field device 1 to which the setting information (the device setting information) is to be written. Then, the gateway functional unit 33 writes the device setting information stored in the Modbus register 32 to the authenticated field device 1. Thereby, the device setting information is set in the field device 1.

The gateway functional unit 33 transmits the process data acquired from the serial communicator 25 to the field device 1 via the antenna 34. On the other hand, the gateway functional unit 33 transmits the process data acquired from the antenna 34 to the PLC 2 via the serial communicator 31.

Figure 4:
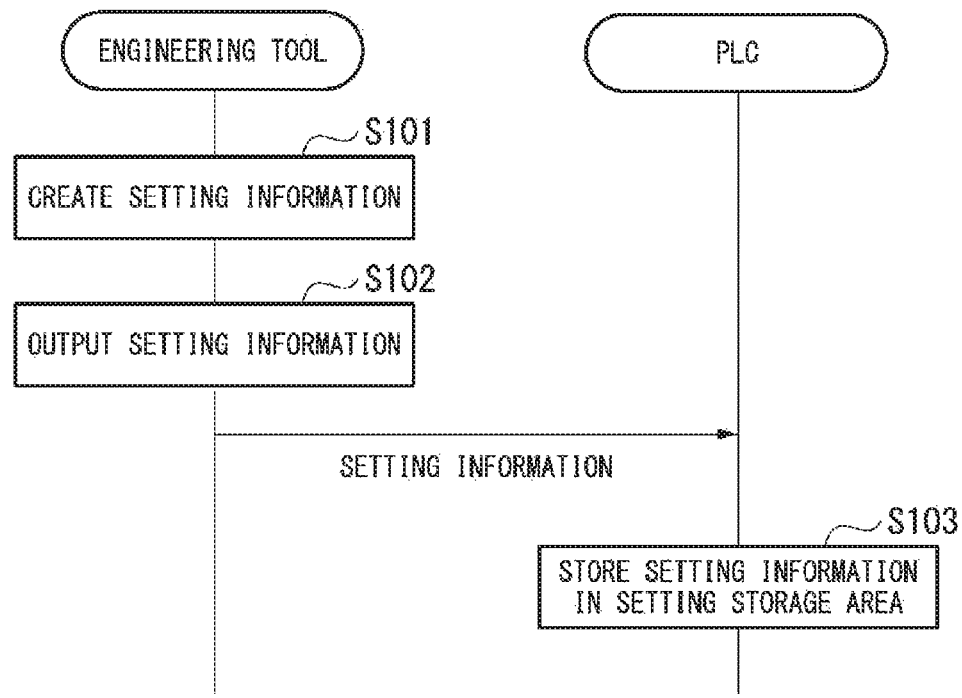
FIG. 4 is a sequence diagram of an operation of writing setting information to the PLC 2 from an engineering tool 100 according to an embodiment of the present invention.
Figure 5:
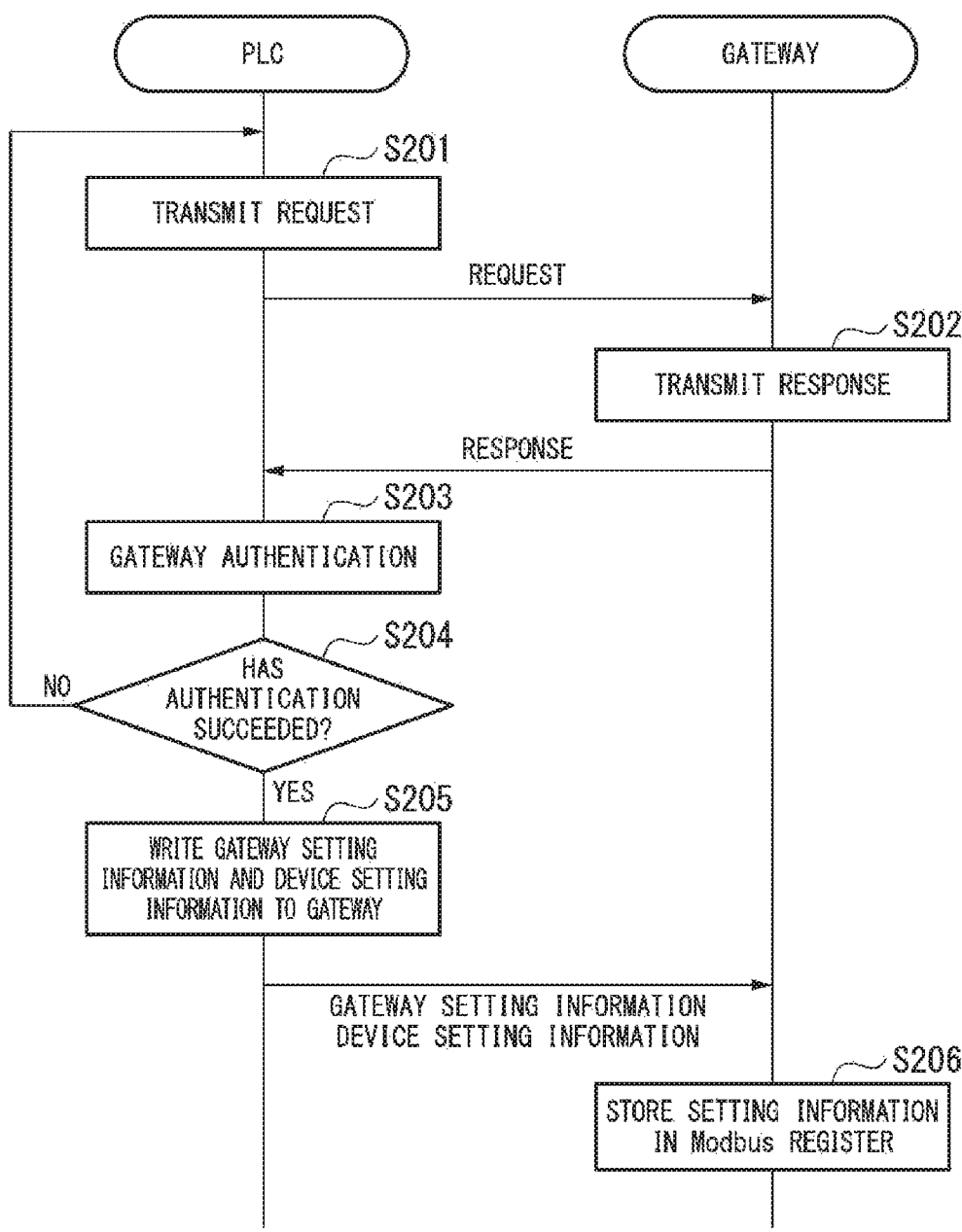
FIG. 5 is a sequence diagram of an operation of writing setting information to the gateway 3 from the PLC 2 according to an embodiment of the present invention.
Figure 6:
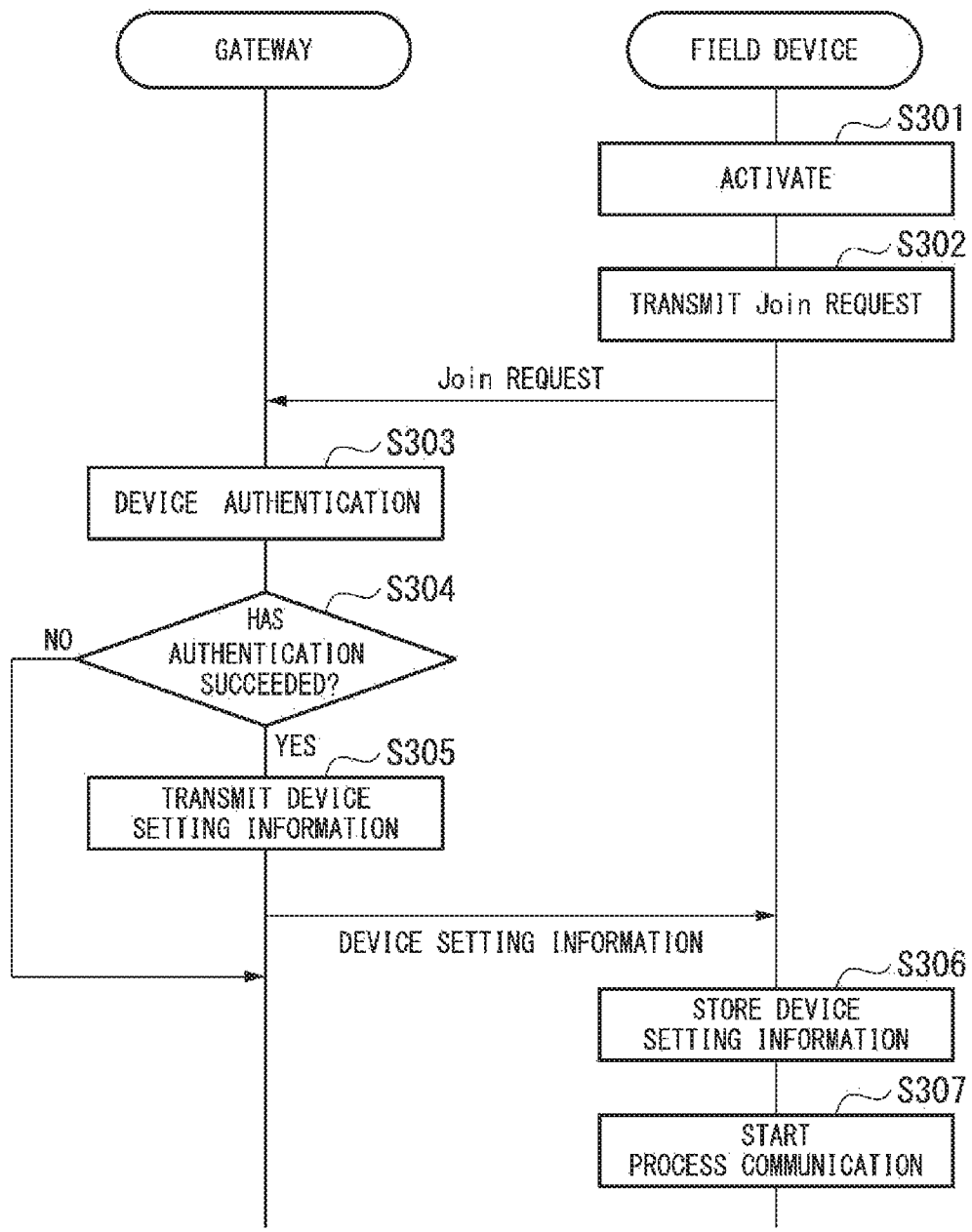
FIG. 6 is a sequence diagram of an operation of writing setting information to the field device 1 from the gateway 3 according to an embodiment of the present invention.

A flow of a setting information setting method according to an embodiment of the present invention will be described below with reference to FIGS. 4 to 6.

(Writing of Setting Information From Engineering Tool 100 to PLC 2)

First, a flow of writing of setting information from the engineering tool 100 to the PLC 2 will be described with reference to FIG. 4.

The engineering tool 100 creates setting information that is to be set in each of the field device 1, the PLC 2, and the gateway 3 according to design data that is specifications of the plant (step S101).

The engineer connects the engineering tool 100 to the PLC through an Ethernet cable. Then, when connected to the PLC 2, the engineering tool 100 outputs PLC setting information, gateway setting information, and device setting information, which are respective setting information of the field device 1, the PLC 2, and the gateway 3, to the PLC 2 (step S102).

The setting management unit 22 of the PLC 2 stores the setting information acquired from the engineering tool 100 in the setting storage area 23 (step S103). For example, the setting management unit 22 of the PLC 2 stores the PLC setting information acquired from the engineering tool 100 in the process information area 231. Thereby, the PLC setting information is set in the PLC 2.

The setting management unit 22 stores the gateway setting information acquired from the engineering tool 100 in the gateway setting area 232. The setting management unit 22 stores the device setting information acquired from the engineering tool 100 in the field device setting area 233.

(Writing of Setting Information From PLC 2 to Gateway 3)

Next, a flow of writing of setting information from the PLC 2 to the gateway 3 will be described with reference to FIG. 5.

Upon completion of the above writing of the setting information from the engineering tool 100 to the PLC 2, the setting management unit 22 of the PLC 2 transmits a request to the gateway 3 via the serial communicator 25 (step S201). The setting management unit 22 continues to transmit requests at predetermined intervals until a response is received from the gateway 3.

For example, when the gateway 3 is activated, the gateway 3 is communicably connected to the PLC 2. The gateway 3 communicably connected to the PLC 2 acquires a request from the PLC 2. Then, when the gateway 3 has acquired a request from the PLC 2, the gateway 3 transmits a response including a gateway tag of the gateway 3 to the PLC 2 (step S202).

The setting management unit 22 performs gateway authentication using the gateway tag included in the response transmitted from the gateway 3 (step S203). This gateway authentication is to authenticate that the communicably connected gateway 3 is a gateway to which the gateway setting information stored in the gateway setting area 232 is to be written.

The setting management unit 22 determines whether or not the gateway authentication has succeeded on the basis of the gateway tag included in the response transmitted from the gateway 3 (step S204). For example, the setting management unit 22 checks the gateway tag in the response transmitted from the gateway 3 (a first gateway tag) with the gateway tag in the gateway setting information stored in the setting storage area 23 (a second gateway tag).

If the checked result is that the first gateway tag and the second gateway tag match, the setting management unit 22 determines that the authentication has succeeded and performs a process of step S205. In the case in which a plurality of gateway tags are stored in the gateway setting area 232, if the gateway tag included in the response transmitted from the gateway 3 matches one of the plurality of gateway tags stored in the gateway setting area 232, the setting management unit 22 determines that the authentication has succeeded and performs the process of step S205. On the other hand, if the checked result is that the first gateway tag and the second gateway tag do not match, the setting management unit 22 determines that the authentication has failed and returns to the process of step S201.

When the gateway authentication has succeeded, the setting management unit 22 writes the gateway setting information stored in the gateway setting area 232 and the device setting information stored in the field device setting area 233 to the Modbus register 32 of the gateway 3 communicably connected to the serial communicator 25 (step S205).

Thus, the gateway setting information and the device setting information are stored in the Modbus register 32 of the gateway 3 (step S206). Thereby, the gateway setting information is set in the gateway 3.

The frequency and timing of the writing of the setting information from the PLC 2 to the gateway 3 may employ various modes. For example, the PLC 2 may write the gateway setting information or device setting information only when the gateway 3 is activated or when there is a change in the settings. In this case, the number of communications for writing setting information to the gateway 3 can be reduced.

When the gateway 3 is activated, the PLC 2 first reads setting information (gateway setting information and device setting information) stored in the Modbus register 32 of the gateway 3. Then, the PLC 2 may write the gateway setting information and the device setting information stored in the setting storage area 23 to the Modbus register 32 only when there is a difference between the gateway setting information and the device setting information stored in the setting storage area 23 and the gateway setting information and the device setting information stored in the Modbus register 32.

The PLC 2 may also write the setting information to the Modbus register 32 at predetermined intervals. In this case, no highly functional PLC 2 is necessary.

(Writing of Setting Information From Gateway 3 to Field Device 1)

Next, a flow of writing of setting information from the gateway 3 to the field device 1 will be described with reference to FIG. 6.

When the field device 1 is activated (step S301), the field device 1 transmits a join request to the gateway 3 (step S302). The join request is join information set in advance in the field device 1.

The gateway functional unit 33 performs device authentication using the join request transmitted from the field device 1 (step S303). This device authentication is to authenticate that the communicably connected field device 1 is a field device 1 to which the device setting information stored in the Modbus register 32 is to be written. The communicably connected field device 1 refers to the field device 1 that has transmitted the join request.

The gateway functional unit 33 determines whether or not the device authentication has succeeded on the basis of the join request transmitted from the field device 1 (step S304). For example, the gateway functional unit 33 checks the join request transmitted from the field device 1 with join information in the Modbus register 32.

Then, if the checked result is that the join request transmitted from the field device 1 and the join information in the Modbus register 32 match, the gateway functional unit 33 determines that the device authentication has succeeded and performs the process of step S305. In the case in which join information items regarding a plurality of field devices are stored in the Modbus register 32, if the join request transmitted from the field device 1 matches one of the plurality of join information items stored in the Modbus register 32, the gateway functional unit 33 determines that the device authentication has succeeded and performs the process of step S305. On the other hand, if the checked result is that the join request transmitted from the field device 1 and the join information in the Modbus register 32 do not match, the gateway functional unit 33 determines that the device authentication has failed and awaits a join request transmitted from another field device 1.

When the device authentication has succeeded, the gateway functional unit 33 writes the device setting information stored in the Modbus register 32 to the field device 1 that has transmitted the join request (step S305). When the device authentication has succeeded, the gateway functional unit 33 may write only process setting information in the device setting information stored in the Modbus register 32 to the field device 1 that has transmitted the join request. This is because the join information has already been set in the field device 1.

Thus, the device setting information is stored in the field device 1 (step S306). Accordingly, the device setting information (process setting information) is set in the field device 1.

The field device 1 starts process communication with the gateway 3 on the basis of the set process setting information (step S307).

(Change of Setting Information that has Already Been Set)

Figure 7:
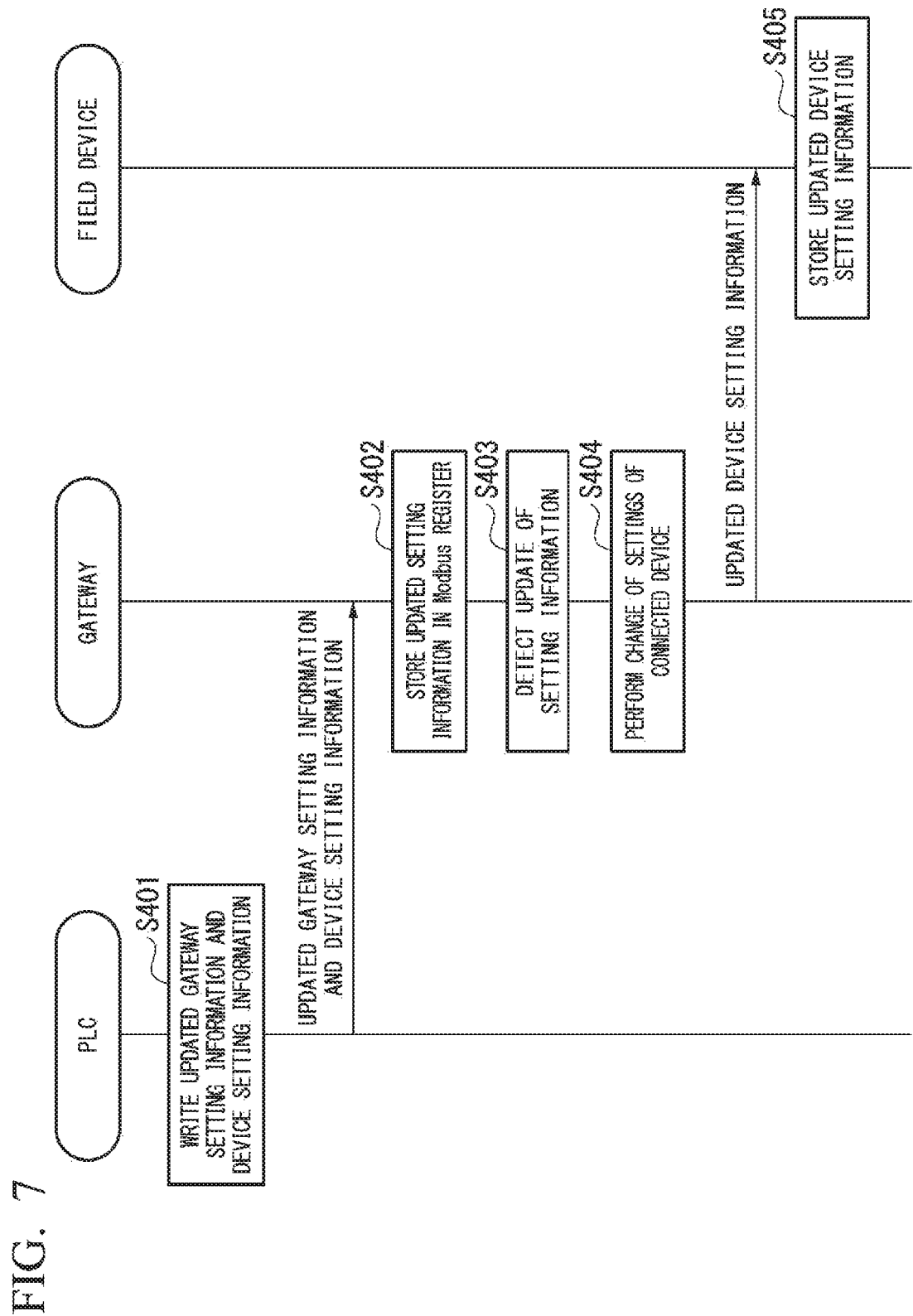
FIG. 7 is a sequence diagram of a method of performing change of settings of setting information set in each of the PLC 2, the gateway 3 and the field device 1 according to an embodiment of the present invention.

Next, a method of performing change of settings of setting information set in the PLC 2, the gateway 3, and the field device 1 in the case in which the PLC 2, the gateway 3, and the field device 1 are communicably connected will be described with reference to FIG. 7. Information whose setting is to be changed is a communication path or a data update cycle of process setting information in the device setting information.

The PLC 2 acquires updated PLC setting information, gateway setting information and device setting information from the engineering tool 100 and stores the acquired information in the setting storage area 23. That is, the updated PLC setting information is stored in the process information area 231. Thereby, the updated PLC setting information is set in the PLC 2. The updated gateway setting information is stored in the gateway setting area 232. The updated device setting information is stored in the field device setting area 233.

The setting management unit 22 of the PLC 2 writes the updated gateway setting information and device setting information stored in the setting storage area 23 to the Modbus register 32 of the communicatively connected gateway 3 (step S401). Thus, the updated gateway setting information and device setting information are stored in the Modbus register 32 of the gateway 3 (step S402). Thereby, the updated gateway setting information is set in the gateway 3.

The gateway functional unit 33 detects that the information stored in the Modbus register 32 has been updated (step S403). Then, the gateway functional unit 33 determines whether or not the updated information in the Modbus register 32 is gateway setting information of a field device 1 which has already been communicably connected. Upon determining that the updated information in the Modbus register 32 is the gateway setting information of the field device 1 that has already been communicably connected, the gateway functional unit 33 writes the device setting information stored in the Modbus register 32 (the updated device setting information) to the field device 1 that has already been communicably connected. In this case, the gateway functional unit 33 may write only the updated information in the process setting information to the field device 1.

Thus, the updated device setting information is stored in the field device 1 (step S405). Accordingly, the updated device setting information (process setting information) is set in the field device 1. Depending on the content of change of settings of the device setting information, the gateway functional unit 33 may restart the field device 1 for which the change of settings is to be performed. Then, when the restarted field device 1 is communicably connected, the gateway functional unit 33 may write the updated device setting information stored in the Modbus register 32 to the field device 1.

As described above, the PLC 2 according to the present embodiment includes the gateway setting area 232 for storing gateway setting information, the field device setting area 233 for storing device setting information, and the setting management unit 22 configured to write the gateway setting information and the device setting information to the gateway 3. Thereby, the engineer can set various setting information for the gateway 3 and the field device 1 with one engineering tool 100 without using a gateway engineering tool. Therefore, when there is a change in the setting information of the gateway 3 or the field device 1, the engineer can change the settings of the gateway 3 or the field device 1 from the PLC 2 in the control room. Thus, the engineer does not have to go to the plant. This improves the work efficiency of the engineer.

Depending on the type of the gateway 3, the gateway 3 may have only one serial communication port. In this case, in the related art, to perform various change of settings of the gateway 3, the engineer temporarily disconnects a serial cable, which connects the PLC 2 and the serial communication port of the gateway 3, from the serial communication port. Then, the engineer connects a gateway engineering tool to the serial communication port to perform various change of settings of the gateway 3. Thus, when the gateway engineering tool is connected to the gateway 3, the communication between the PLC 2 and the gateway 3 is disconnected. In the case in which the gateway 3 is supplied with power through the serial communication port, if the serial cable which connects the PLC 2 and the serial communication port of the gateway 3 is temporarily disconnected, the power of the gateway 3 is cut off. Therefore, the communication between the gateway 3 and the field device 1 is disconnected.

In the present embodiment, the engineer can perform various settings on the gateway 3 simply by connecting the engineering tool 100 to the PLC 2 and causing various gateway setting information, which is setting information for the gateway 3, to be output to the PLC 2 from the engineering tool 100. Thus, the engineer does not need to connect the engineering tool 100 to the gateway 3. That is, the engineer does not have to temporarily disconnect the serial cable, which connects the PLC 2 and the serial communication port of the gateway 3, from the serial communication port. Therefore, when the settings of the gateway 3 are to be changed, the communication between the PLC 2 and the gateway 3 is not disconnected. Even when the gateway 3 is supplied with power through the serial communication port, the power of the gateway 3 is not cut off.

In the related art, setting for associating information set in the PLC 2 and information set in the gateway 3 or the field device 1 with each other is performed manually by an engineer. This manual association complicates engineering and can cause engineering errors. In the present embodiment, with one engineering tool 100, it is possible to associate information set in the PLC 2 and information set in the gateway 3 or the field device 1 with each other. Thus, the field wireless system A of the present embodiment facilitates such association and is less likely to cause engineering errors.

The gateway of the related art needs to always store setting information of both setting information of the gateway and setting information of field devices. Therefore, the gateway of the related art needs a non-volatile storage area for storing both the setting information of the gateway and the setting information of field devices. On the other hand, for example, when the gateway 3 of the present embodiment is activated such as when powered on, gateway setting information and device setting information are written from the PLC 2 to the gateway 3. Therefore, the gateway 3 does not need to always store the gateway setting information and the device setting information in the storage areas. That is, in the gateway 3, the area for storing the gateway setting information and the device setting information need not be a non-volatile storage area and may be a volatile storage area. Thus, it is possible to reduce the hardware size and power consumption of the gateway 3.

The present invention is not limited to the above embodiment and it is possible to consider, for example, the following modifications.

Figure 8:
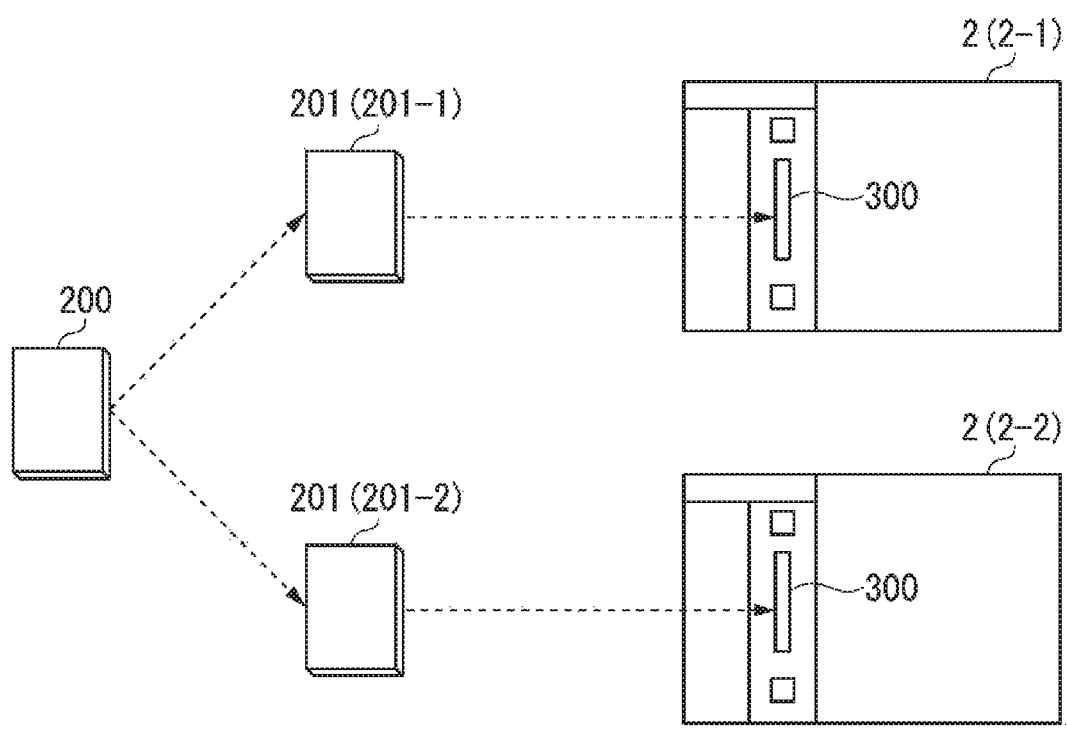
FIG. 8 is a diagram for explaining PLCs 2 using removable external storage media 201 according to an embodiment of the present invention.

(1) In the above embodiment, although the PLC 2 acquires PLC setting information, gateway setting information, and device setting information from the engineering tool 100, the present invention is not limited thereto. For example, as shown in FIG. 8, PLCs 2 may acquire PLC setting information, gateway setting information, and device setting information by inserting a removable external storage medium 201 into them. For example, PLCs 2 have insertion openings 300 into which external storage media 201 are inserted. The external storage media 201 are removable storage media which are, for example, storage media such as secure digital (SD) memory cards or digital versatile discs (DVDs).

The external storage media 201 store PLC setting information, gateway setting information, and device setting information. Setting information (PLC setting information, gateway setting information, and device setting information) for a PLC 2-1 is stored in an external storage medium 201-1. On the other hand, setting information (PLC setting information, gateway setting information, and device setting information) for a PLC 2-2 is stored in an external storage medium 201-2. The setting information stored in the external storage medium 201-1 or the external storage medium 201-2 is generated by copying and editing setting information stored in an external storage medium 200 of a master.

The external storage medium 201 serves as a setting storage area 23 by being inserted into the insertion opening 300 of the PLC 2.

Figure 9:
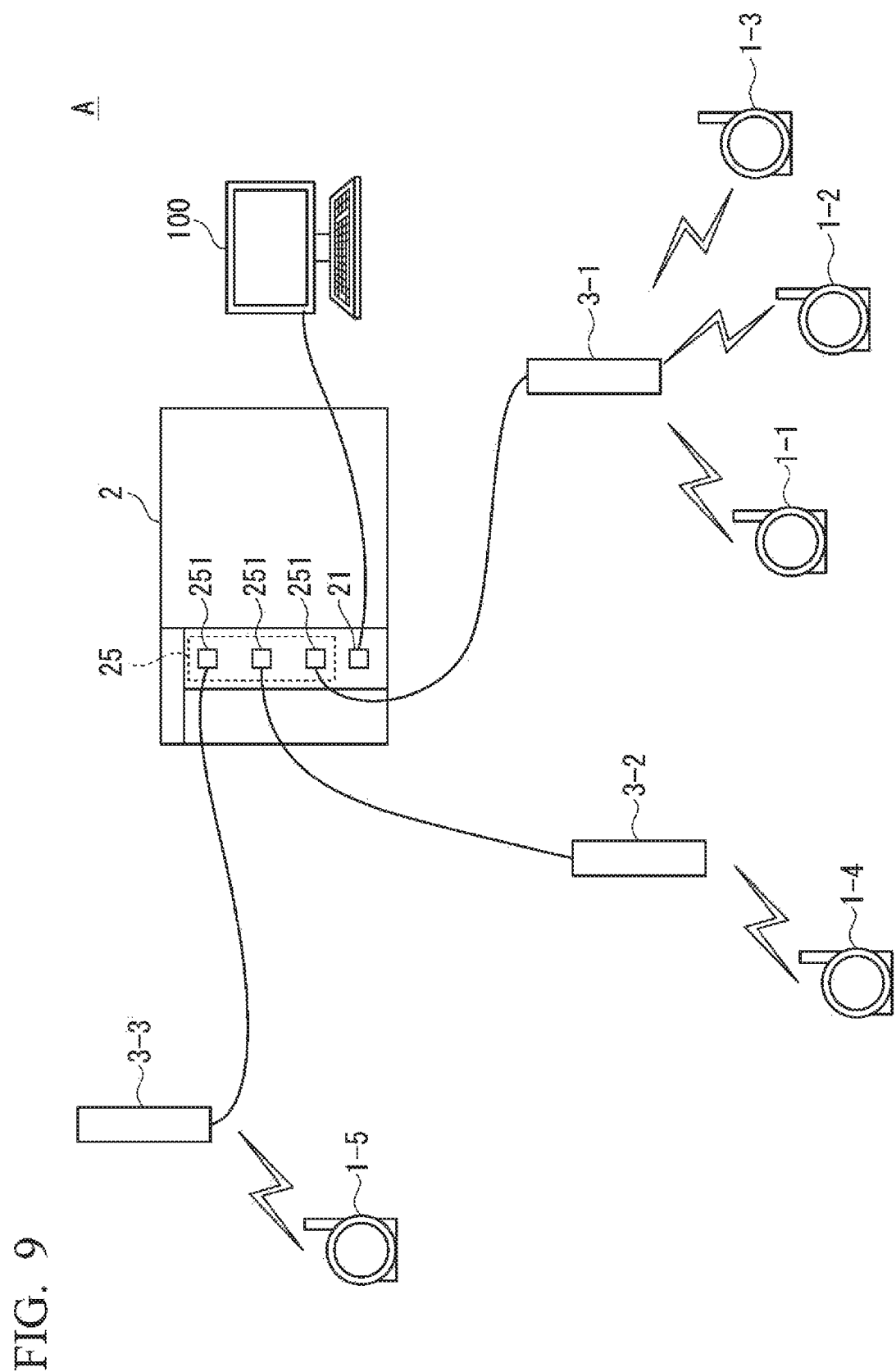
FIG. 9 is a diagram for explaining a field wireless system using a plurality of gateways 3 according to an embodiment of the present invention.

(2) In the above embodiment, the field wireless system A has been described as having one gateway 3, but the present invention is not limited thereto. For example, the field wireless system A may have a plurality of gateways 3. As an example, a field wireless system A includes three gateways 3-1 to 3-3 as shown in FIG. 9.

The gateways 3-1 to 3-3 have the same configuration as the gateway 3 described above. The gateway 3-1 is communicably connected to field devices 1-1 to 1-3. The gateway 3-2 is communicably connected to a field device 1-4. The gateway 3-3 is communicably connected to a field device 1-5.

For example, a PLC 2 manages the plurality of gateways 3-1 to 3-3. For example, the PLC 2 includes a plurality of serial communication ports 251 as the serial communicator 25. The gateways 3-1 to 3-3 are connected respectively to the plurality of serial communication ports 251. Thus, even when the gateways 3-1 to 3-3 are installed in different plants, setting information of each of the gateways 3-1 to 3-3 and the field devices 1 (1-1 to 1-5) communicably connected to the gateways 3-1 to 3-3 can be set from one PLC 2. In this case, the PLC 2 can identify the plurality of field devices 1 through gateway tags.

Device setting information that is written to each of the gateways 3-1 to 3-3 from the PLC 2 may be setting information of all field devices 1 (1-1 to 1-5) or may be setting information of only a field device(s) 1 communicably connected to each of the gateways 3-1 to 3-3. However, in the case in which setting information of only the communicably connected field device 1 is written to each of the gateways 3-1 to 3-3, it is necessary to acquire in advance information indicating which field device 1 is connected to each of the gateways 3-1 to 3-3.

Figure 10:
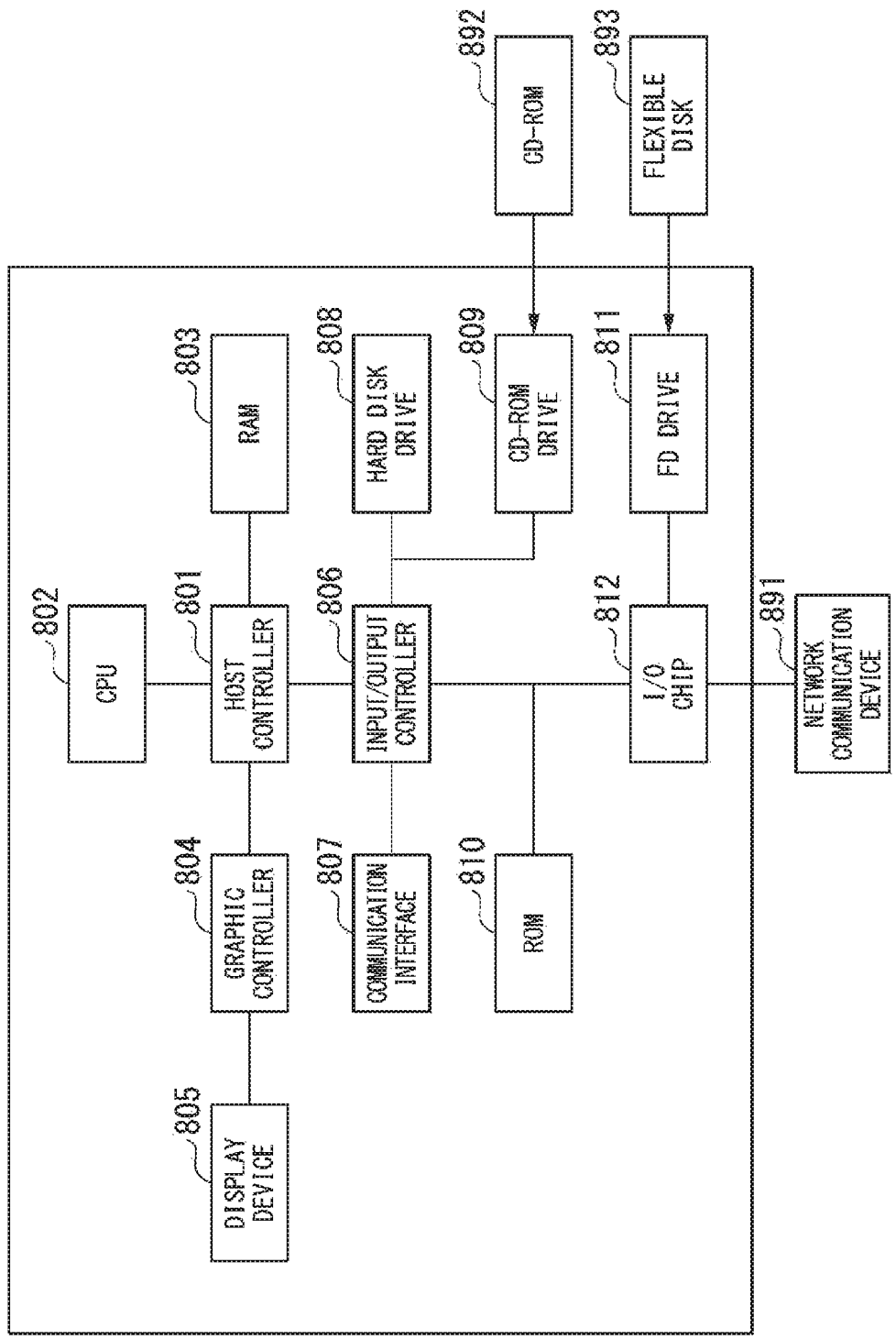
FIG. 10 is a diagram showing an exemplary hardware configuration when a PLC 2 and a gateway 3 according to an embodiment of the present invention are constructed using an electronic information processing device such as a computer.

FIG. 10 shows an exemplary hardware configuration when a PLC 2 and a gateway 3 are constructed using an electronic information processing device such as a computer. The PLC 2 and the gateway 3 include a central processing unit (CPU) peripheral portion, an input/output portion, and a legacy input/output portion. The CPU peripheral portion includes a CPU 802, a random access memory (RAM) 803, a graphic controller 804, and a display device 805 which are connected to each other through a host controller 801. The input/output portion includes a communication interface 807, a hard disk drive 808, and a compact disk read only memory (CD-ROM) drive 809 which are connected to the host controller 801 through an input/output controller 806. The legacy input/output portion includes a read only memory (ROM) 810, a flexible disk drive 811, and an input/output chip 812 which are connected to the input/output controller 806.

The host controller 801 connects the RAM 803 with the CPU 802 and the graphic controller 804 which access the RAM 803 at a high transfer rate. The CPU 802 operates on the basis of programs stored in the ROM 810 and the RAM 803 to control each part. The graphic controller 804 acquires image data that the CPU 802 or the like generates on a frame buffer provided in the RAM 803 and causes the display device 805 to display the image data. Instead of this, the graphic controller 804 may internally include a frame buffer for storing image data generated by the CPU 802 or the like.

The input/output controller 806 connects the host controller 801 with the hard disk drive 808, the communication interface 807, and the CD-ROM drive 809 which are relatively high-speed input/output devices. The hard disk drive 808 stores programs used by the CPU 802 and data. The communication interface 807 is connected to a network communication device 891 to transmit and receive programs or data. The CD-ROM drive 809 reads a program or data from a CD-ROM 892 and provides it to the hard disk drive 808 and the communication interface 807 via the RAM 803.

The ROM 810 and relatively low-speed input/output devices, which are the flexible disk drive 811 and the input/output chip 812, are connected to the input/output controller 806. The ROM 810 stores boot programs that the PLC 2 and the gateway 3 execute when activated, programs depending on the hardware of the PLC 2 and the gateway 3, or the like. The flexible disk drive 811 reads a program or data from the flexible disk 893 and provides it to the hard disk drive 808 and the communication interface 807 via the RAM 803. The input/output chip 812 connects various input/output devices via the flexible disk drive 811 or a parallel port, a serial port, a keyboard port, a mouse port or the like.

The program to be executed by the CPU 802 is stored in a recording medium such as the flexible disk 893, the CD-ROM 892, or an integrated circuit (IC) card and provided by a user. The program stored in the recording medium may be compressed or uncompressed. The program is installed from the recording medium to the hard disk drive 808, read into the RAM 803, and executed by the CPU 802. The program executed by the CPU 802 causes the PLC 2 to function as the Ethernet communicator 21, the setting management unit 22, the setting storage area 23, the process management unit 24, and the serial communicator 25 which have been described above in connection with FIGS. 1 to 9 and causes the gateway 3 to function as the serial communicator 31, the gateway functional unit 33, the Modbus register 32, and the antenna 34 which have been described above in connection with FIGS. 1 to 9.

The programs described above may also be stored in an external storage medium. As the storage medium, it is possible to use not only the flexible disk 893 and the CD-ROM 892 but also an optical recording medium such as a digital versatile disk (DVD) or a phase disk (PD), a magneto-optical recording medium such as a MiniDisk (MD), a tape medium, a semiconductor memory such as an IC card, or the like. A storage medium such as a RAM or a hard disk provided in a server system connected to a dedicated communication network or the Internet may be used as a recording medium and provided as a program via the network.

The invention claimed is:

1. A management device configured to transmit and receive information to and from a relay device that is able to communicate via a network with a field device installed in a plant, the management device comprising:
   a first communicator that is able to communicate with the relay device;
   a receiving unit configured to receive, from an engineering tool, first setting information that is setting information of the relay device for communication connection with the management device and second setting information that is setting information of the field device for joining the network, the first setting information and the second setting information having been created by the engineering tool;
   a hardware memory including a first setting storage area configured to store the first setting information and a second setting storage area configured to store the second setting information;
   a first setting management unit that is implemented by a hardware processor and configured to at least:
      acquire identification information that identifies the relay device from the relay device upon detecting that the first communicator and the relay device are communicably connected;
      determine whether the communicably connected relay device is a relay device to which writing is to be performed by checking the first setting information stored in the first setting storage area with the acquired identification information; and
      write, via the first communicator upon determining that the communicably connected relay device is the relay device to which writing is to be performed, the first setting information and the second setting information to the relay device that is associated with the acquired identification information.

2. The management device of claim 1, wherein the first setting management unit determines whether the communicably connected relay device is a relay device to which writing is to be performed by checking whether the first setting information that is stored in the first setting storage area matches the acquired identification information, and
   when the first setting information matches the acquired identification information, the first setting management unit writes, via the first communicator, the first setting information and the second setting information to the relay device.

3. The management device of claim 2, wherein the first setting information comprises a gateway tag set by the engineering tool, and the acquired identification information comprises a gateway tag of the relay device.

4. The management device of claim 1, wherein the management device is a programmable logic controller, the relay device is a gateway communicatively coupled via the network to the field device.

5. The management device of claim 1, wherein the first communicator comprises a serial communication device.

6. The management device of claim 1, wherein the receiving unit receives the first setting information and the second setting information from the engineering tool via Ethernet communication.

7. The management device of claim 1, wherein the first setting information comprises one or more of a baud rate for connection with the management device, a Modbus address, a gateway tag, or a network identifier of a gateway.

8. The management device of claim 1, wherein the second setting information comprises one or more of join information, a device tag, a join key, a network identifier, and the second setting information comprises process setting information that includes one or more of a data type, a data update period, or a communication path.

9. A field wireless system comprising:
   a field device installed in a plant;
   a relay device that is able to communicate with the field device via a network; and
   a management device that is able to transmit and receive information to and from the relay device,
   wherein the management device includes:
      a first communicator that is able to communicate with the relay device;
      a receiving unit configured to receive, from an engineering tool, first setting information that is setting information of the relay device for communication connection with the management device and second setting information that is setting information of the field device for joining the network, the first setting information and the second setting information having been created by the engineering tool;
   a hardware memory including a first setting storage area configured to store the first setting information and a second setting storage area configured to store the second setting information;
   a first setting management unit that is implemented by a first hardware processor and configured to at least:
      acquire identification information that identifies the relay device from the relay device upon detecting that the first communicator and the relay device are communicably connected;
      determine whether the communicably connected relay device is a relay device to which writing is to be performed by checking the first setting information stored in the first setting storage area with the acquired identification information; and
      write, via the first communicator upon determining that the communicably connected relay device is the relay device to which writing is to be performed, the first setting information and the second setting information to the relay device that is associated with the acquired identification information,
   wherein the relay device includes a second setting management unit that is implemented by a second hardware processor and configured to at least write the second setting information, from among the first setting information and the second setting information written by the management device, to the field device.

10. The field wireless system of claim 9, wherein the first setting management unit determines whether the communicably connected relay device is a relay device to which writing is to be performed by checking whether the first setting information that is stored in the first setting storage area matches the acquired identification information, and when the first setting information matches the acquired identification information, the first setting management unit writes, via the first communicator, the first setting information and the second setting information to the relay device.

11. The field wireless system of claim 10, wherein the first setting information comprises a gateway tag set by the engineering tool, and the acquired identification information comprises a gateway tag of the relay device.

12. The field wireless system of claim 9, wherein the management device is a programmable logic controller, the relay device is a gateway communicatively coupled via the network to the field device.

13. The field wireless system of claim 9, wherein the first communicator comprises a serial communication device.

14. The field wireless system of claim 9, wherein the receiving unit receives the first setting information and the second setting information from the engineering tool via Ethernet communication.

15. The field wireless system of claim 9, wherein the first setting information comprises one or more of a baud rate for connection with the management device, a Modbus address, a gateway tag, or a network identifier of a gateway.

16. The field wireless system of claim 9, wherein the second setting information comprises one or more of join information, a device tag, a join key, a network identifier, and the second setting information comprises process setting information that includes one or more of a data type, a data update period, or a communication path.

17. A non-transitory computer readable recording medium storing one or more programs which, when executed, cause a computer to function as a management device configured to transmit and receive information to and from a relay device that is able to communicate via a network with a field device installed in a plant, wherein the management device comprises a first communicator that is able to communicate with the relay device, and wherein the one or more programs when executed by the computer cause the computer to at least:

receive, from an engineering tool, first setting information that is setting information of the relay device for communication connection with the management device and second setting information that is setting information of the field device for joining the network, the first setting information and the second setting information having been created by the engineering tool;

store the first setting information in a first setting storage area of a hardware memory in the management device;

store the second setting information in a second setting storage area of the hardware memory;

acquire identification information that identifies the relay device from the relay device upon detecting that the first communicator and the relay device are communicably connected;

determine whether the communicably connected relay device is a relay device to which writing is to be performed by checking the first setting information stored in the first setting storage area with the acquired identification information; and write, via the first communicator upon determining that the communicably connected relay device is the relay device to which writing is to be performed, the first setting information and the second setting information to the relay device that is associated with the acquired identification information.

18. The non-transitory computer readable recording medium of claim 17, wherein whether the communicably connected relay device is a relay device to which writing is to be performed is determined by checking whether the first setting information that is stored in the first setting storage area matches the acquired identification information, and when the first setting information matches the acquired identification information, the first setting information and the second setting information are written to the relay device.

19. The non-transitory computer readable recording medium of claim 18, wherein the first setting information comprises a gateway tag set by the engineering tool, and the acquired identification information comprises a gateway tag of the relay device.

20. The non-transitory computer readable recording medium of claim 17, wherein the first setting information comprises a baud rate for connection with the management device, a Modbus address, a gateway tag, or a network identifier of a gateway, and wherein the second setting information comprises one or more of join information, a device tag, a join key, a network identifier of the field device, and the second setting information comprises process setting information that includes one or more of a data type, a data update period, or a communication path.

* * * * *